(12) United States Patent
Ramanujam

(10) Patent No.: US 8,038,402 B2
(45) Date of Patent: Oct. 18, 2011

(54) COMPACT GEARED DRIVE TRAIN

(75) Inventor: Saravanan Ramanujam, Tamilnadu (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/891,905

(22) Filed: Sep. 28, 2010

(65) Prior Publication Data

US 2011/0142649 A1    Jun. 16, 2011

(51) Int. Cl.
*F03D 11/02* (2006.01)
*F03D 9/00* (2006.01)

(52) U.S. Cl. .................. 416/169 R; 416/170 R

(58) Field of Classification Search ............. 415/122.1, 415/123.1, 124.1; 416/170 R, 169 R; 290/1 C
See application file for complete search history.

(56) References Cited

U.S. PATENT DOCUMENTS

| | | | |
|---|---|---|---|
| 4,274,023 A * | 6/1981 | Lamprey | 310/83 |
| 5,663,600 A | 9/1997 | Baek et al. | |
| 6,420,808 B1 | 7/2002 | Hosle | |
| 6,459,165 B1 * | 10/2002 | Schoo | 290/1 C |
| 6,790,156 B2 * | 9/2004 | Hosle | 475/331 |
| 6,872,049 B2 | 3/2005 | Christensen | |
| 7,154,191 B2 | 12/2006 | Jansen et al. | |
| 7,154,193 B2 | 12/2006 | Jansen et al. | |
| 7,179,056 B2 * | 2/2007 | Siegfriedsen | 416/170 R |
| 7,180,204 B2 | 2/2007 | Grant et al. | |
| 7,538,446 B2 * | 5/2009 | Bonnet | 290/55 |
| 2003/0201647 A1 * | 10/2003 | Makino et al. | 290/55 |
| 2006/0205557 A1 | 9/2006 | Arndt et al. | |
| 2007/0075548 A1 | 4/2007 | Bagepalli et al. | |
| 2009/0026771 A1 * | 1/2009 | Bevington et al. | 290/55 |
| 2010/0032961 A1 * | 2/2010 | Numajiri | 290/55 |
| 2010/0137092 A1 * | 6/2010 | Weichbold et al. | 475/31 |
| 2010/0197436 A1 * | 8/2010 | Ideshio et al. | 475/8 |

* cited by examiner

*Primary Examiner* — Edward Look
*Assistant Examiner* — Jesse Prager
(74) *Attorney, Agent, or Firm* — James W. Pemrick; Ernest G. Cusick; Frank A. Landgraff

(57) ABSTRACT

A drive train for a wind turbine is provided. The wind turbine includes a rotor hub and one or more blades. The drive train includes a first stage carrier connected to the rotor hub. The first stage carrier includes one or more first stage planet gears that interact with a fixed first stage ring gear and a rotating first stage sun gear. A second stage planet carrier includes one or more second stage planet gears. The second stage planet carrier is rigidly connected to the first stage sun gear. The second stage planet gears interact with a rotating second stage ring gear and a non-rotating second stage sun gear. A generator includes a generator rotor and a generator stator, and the generator rotor is fixedly connected to the second stage ring gear so that both the generator rotor and the second stage ring gear rotate together.

20 Claims, 4 Drawing Sheets

COMPACT GEARED DRIVE TRAIN

BACKGROUND OF THE INVENTION

The apparatus described herein relates generally to a compact drive train. More specifically, the apparatus relates to a compact geared drive train for a wind turbine.

Recently, wind turbines have received increased attention as environmentally safe and relatively inexpensive alternative energy sources. Wind turbines do not emit greenhouse gases (GHGs), and therefore, do not contribute to global warming. With the growing interest in wind generated electricity, considerable efforts have been made to develop wind turbines that are reliable and efficient.

Wind is usually considered to be a form of solar energy caused by uneven heating of the atmosphere by the sun, irregularities of the earth's surface, and rotation of the earth. Wind flow patterns are modified by the earth's terrain, bodies of water, and vegetation. The terms wind energy or wind power, describe the process by which the wind is used to rotate a shaft and subsequently generate mechanical power or electricity.

Typically, wind turbines are used to convert the kinetic energy in the wind into mechanical power. This mechanical power may be used for specific tasks (such as grinding grain or pumping water) or a generator may convert this mechanical power (i.e., the rotation of a shaft) into electricity. A wind turbine usually includes an aerodynamic mechanism (e.g., blades) for converting the movement of air into a mechanical motion (e.g., rotation), which is then converted with a generator into electrical power. Power output from the generator is proportional to the cube of the wind speed. As wind speed doubles, the capacity of wind generators increases almost eightfold.

The majority of commercially available wind turbines utilize geared drive trains to connect the turbine blades to the electrical generators. The wind turns the turbine blades, which spin a low speed shaft, which feeds into a gearbox having a higher speed output shaft. This higher speed output shaft connects to a generator and makes electricity. The geared drive aims to increase the velocity of the mechanical motion.

The industry standard drive train for large (e.g., >1.5 MW) wind turbines consists of discrete gearbox and generator units that are separately mounted to a mainframe (also commonly called a bedframe or bedplate). Power is transferred from the gearbox to the generator via a flexible "high-speed" shaft coupling. This arrangement forces the gearbox and generator to be physically distanced from each other, as well as, requires both the output shaft of the gearbox and the input shaft of the generator to be separately supported by gearbox bearings and generator bearings, respectively.

BRIEF DESCRIPTION OF THE INVENTION

In an aspect of the present invention, a drive train for a wind turbine is provided. The wind turbine includes a rotor hub and one or more blades. The drive train includes a first stage carrier connected to the rotor hub. The first stage carrier includes one or more first stage planet gears that interact with a fixed first stage ring gear and a rotating first stage sun gear. A second stage planet carrier includes one or more second stage planet gears. The second stage planet carrier is rigidly connected to the first stage sun gear. The second stage planet gears interact with a rotating second stage ring gear and a non-rotating second stage sun gear. A generator includes a generator rotor and a generator stator, and the generator rotor is fixedly connected to the second stage ring gear so that both the generator rotor and the second stage ring gear rotate together.

In another aspect of the present invention, a wind turbine is provided. The wind turbine includes a tower, a nacelle supported by the tower, a rotor hub with one or more blades and a drive train. The drive train includes a first stage carrier connected to the rotor hub. The first stage carrier includes one or more first stage planet gears that interact with a fixed first stage ring gear and a rotating first stage sun gear. A second stage planet carrier includes one or more second stage planet gears. The second stage planet carrier is rigidly connected to the first stage sun gear. The second stage planet gears interact with a rotating second stage ring gear and a non-rotating second stage sun gear. A generator includes a generator rotor and a generator stator, and the generator rotor is fixedly connected to the second stage ring gear so that both the generator rotor and the second stage ring gear rotate together.

DETAILED DESCRIPTION OF THE INVENTION

Figure 1:
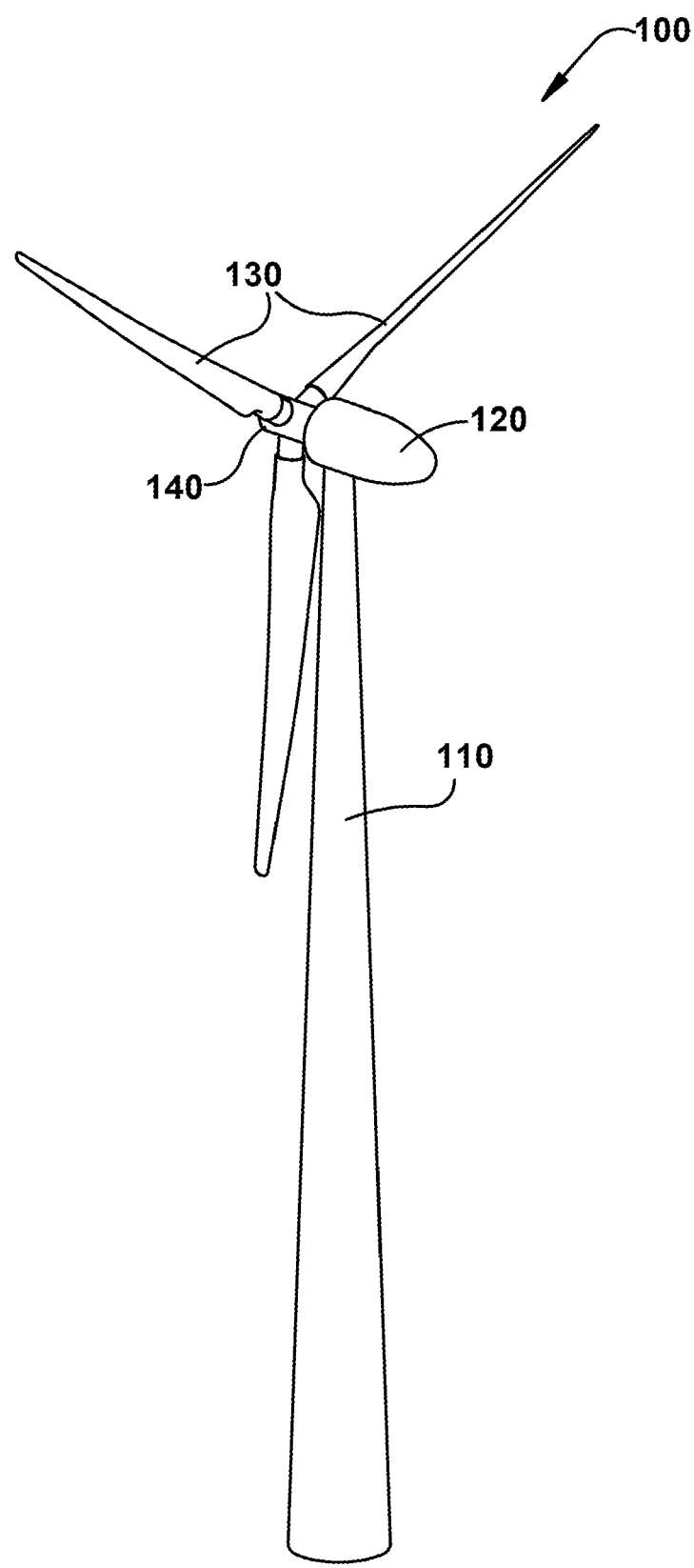
FIG. 1 is a perspective illustration of an exemplary wind turbine.

A horizontal axis wind turbine (HAWT) 100 is illustrated in FIG. 1. The wind turbine 100 may include a generally tubular tower 110, which may be manufactured of steel, concrete or combinations thereof. The tower 110 may be erected by stacking multiple tower segments on top of each other. The tower 110 supports the weight of the nacelle 120, blades 130 and hub 140. Towers may also be of the lattice (or truss) type, and towers may alternatively be formed of concrete or concrete sections. The nacelle 120 typically houses the drive train (e.g., gearbox, shafts, couplings, generator, etc.), as well as the main frame (also called bedplate) and yaw drives. Other items such as the control electronics may be housed within the nacelle 120 as well. Typically, the nacelle 120 has an outer skin that is comprised of a lightweight material such as fiberglass or a graphite composite. The main function of the nacelle skin is to protect the contents from the elements (e.g., rain, ice, snow, etc.).

The blades 130 are connected to the hub 140, and the hub may contain a pitch control mechanism to control the pitch angle of each blade. Typically, three blades are employed in most commercial wind turbines, however, one, two or four or more blades could be employed as well. The blades convert the kinetic energy of the wind into mechanical energy by rotating a low speed shaft. Blades may be manufactured from fiberglass or graphite composites, fiberglass reinforced plastics or wood/epoxy laminates, or other suitable materials. The low speed shaft is connected to the hub 140 typically via a bolted flange coupling.

Generators are used to convert the rotation of a shaft into electrical energy. A gearbox is typically used to increase the speed of the input shaft to the generator. The gearbox has the low speed shaft as its input, and the output is a higher speed shaft, which according to aspects of the present invention, can feed directly into the generator.

Figure 2:
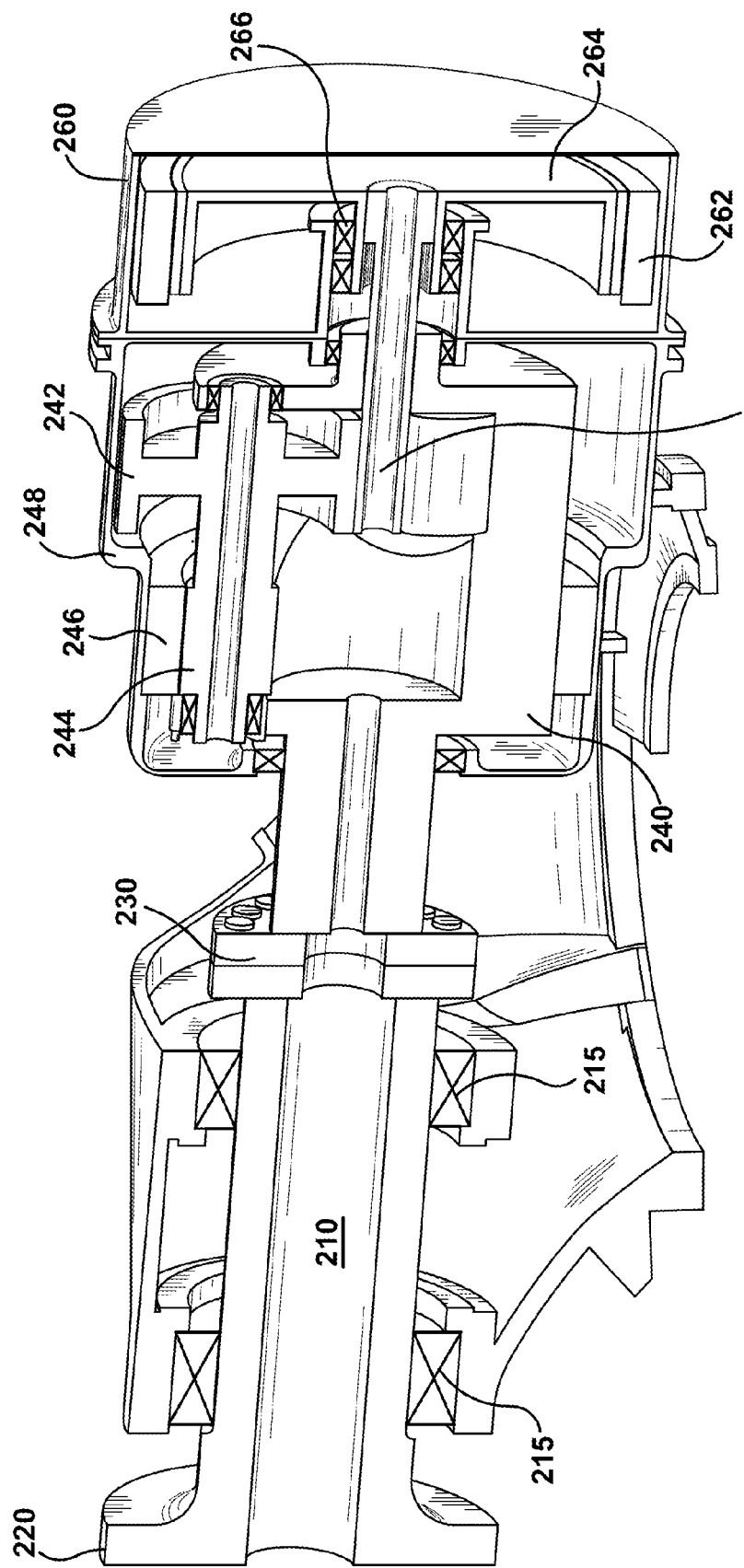
FIG. 2 is a partial, cut-away perspective illustration of one embodiment of a drive train that can be used in the wind turbine of FIG. 1.

FIG. 2 illustrates one known drive train comprising a compound planetary gearbox and generator. The low speed shaft 210 is supported by two separate and axially spaced main bearings 215. The low speed shaft 210 is connected via hub flange mount 220 to the hub 140 and blades 130 of wind turbine 100. Accordingly, low speed shaft 210 is driven by the wind turning blades 130. The low speed shaft 210 is connected to planet carrier 240 through a torque transmitting coupling 230. The planet carrier 240 supports the planet gears 242 and planet pinion gears 244, which share a common shaft. A ring gear 246 is fixedly attached to gearbox housing 248 and meshes with the planet pinion gears 244. A sun gear 250 is driven by the planet gears 242, and the output of the sun gear 250 is fed directly into generator 260.

The generator 260 has a stator 262 and a rotor 264. The rotor 264 is supported by rotor bearings 266, which are enclosed within the generator 260 A disadvantage to this design is that the rotor bearings 266 are isolated from the gearbox. If the rotor bearings need to be accessed, then the entire generator 260 must be removed. This can be a very time consuming and labor intensive process on a wind turbine installed at a remote location.

Figure 3:
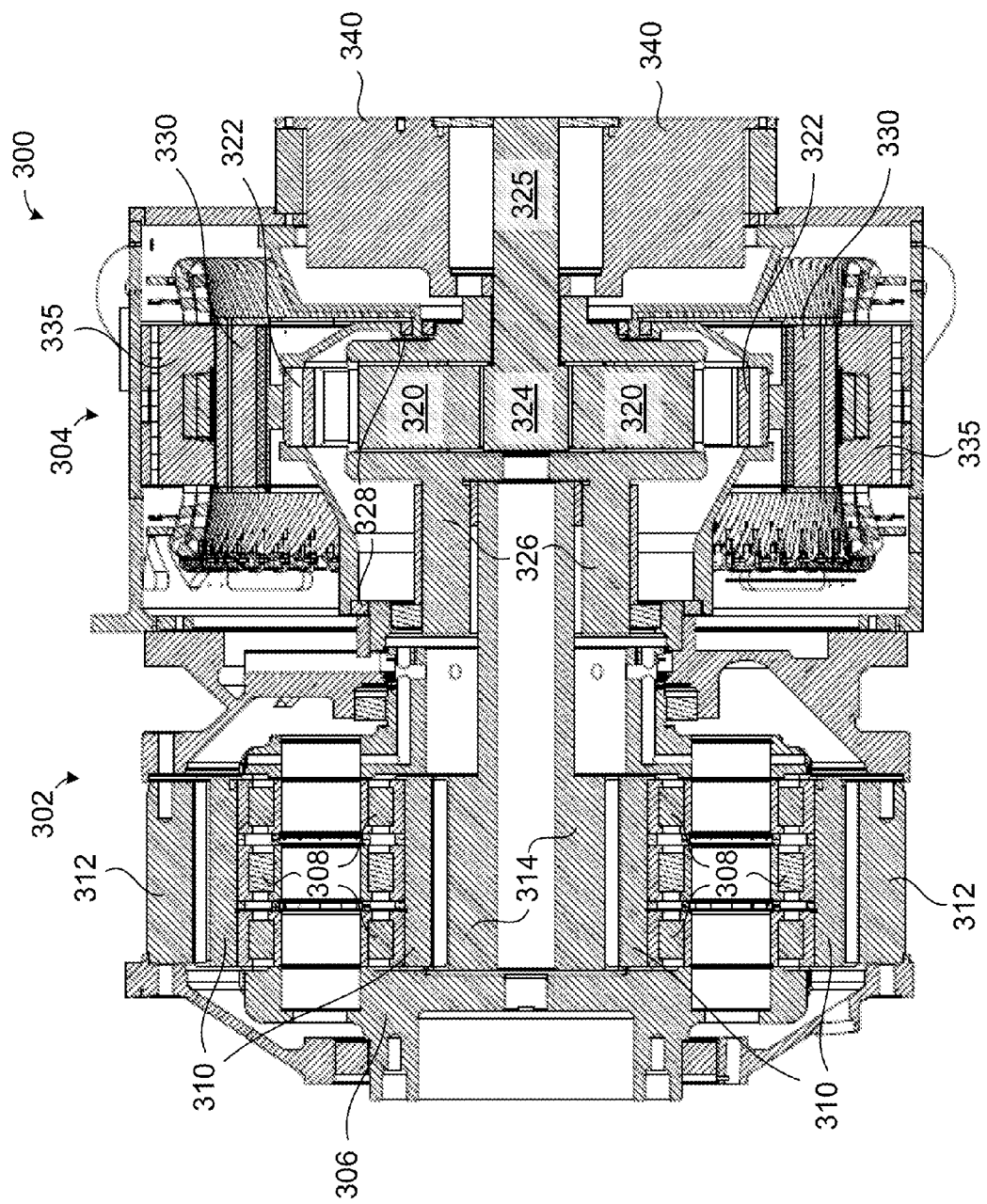
FIG. 3 is a perspective illustration of a drive train that could be used in the wind turbine of FIG. 1, according to an aspect of the present invention.

FIG. 3 illustrates a cross-sectional view of a compact geared drive train 300 according to aspects of the present invention. A planetary gearbox 302 with two stages is coupled with a generator 304 resulting in a drive train having compact size and low weight. The gearbox 302 includes hub connection and carrier 306. The rotor hub 140 connects to carrier 306. The carrier 306 also supports planet gear bearings 308 and first stage planet gears 310. The planet gear bearings 308 could be roller bearings, or any other suitable bearing as desired in the specific application. The planet gears 310 interact with a stationary ring gear 312 and a rotating first stage sun gear 314.

The first stage sun gear 314 is connected to and drives a second stage planet carrier 326. The second stage planet gears 320 rotate around a fixed (i.e., non-rotating) second stage sun gear 324. The planet gears 320 act as idler gears. The second stage ring gear 322 is configured in a floating arrangement and facilitates the coupling of the rotor 330 of generator 304 to ring gear 322. The second stage ring gear 322 may be supported by a pair of roller bearings 328, and is coupled to generator rotor 330. In some applications the roller bearings 328 can be tapered roller bearings. The stator 335 may be connected to the generator housing. In this configuration, the second stage ring gear 322 drives the generator rotor 330, as both are fixedly or rigidly connected together.

The carrier 326 can be coupled to brake assembly 340. Since the sun gear shaft 325 of the second stage is fixed, the carrier 326 can be arrested by brake assembly 340. A drum brake, shoe brake or caliper style brake could be used for brake assembly 340. This arrangement will reduce the over all dimension of the drive train and will offer more compactness compared to the existing known drive trains.

Figure 4:
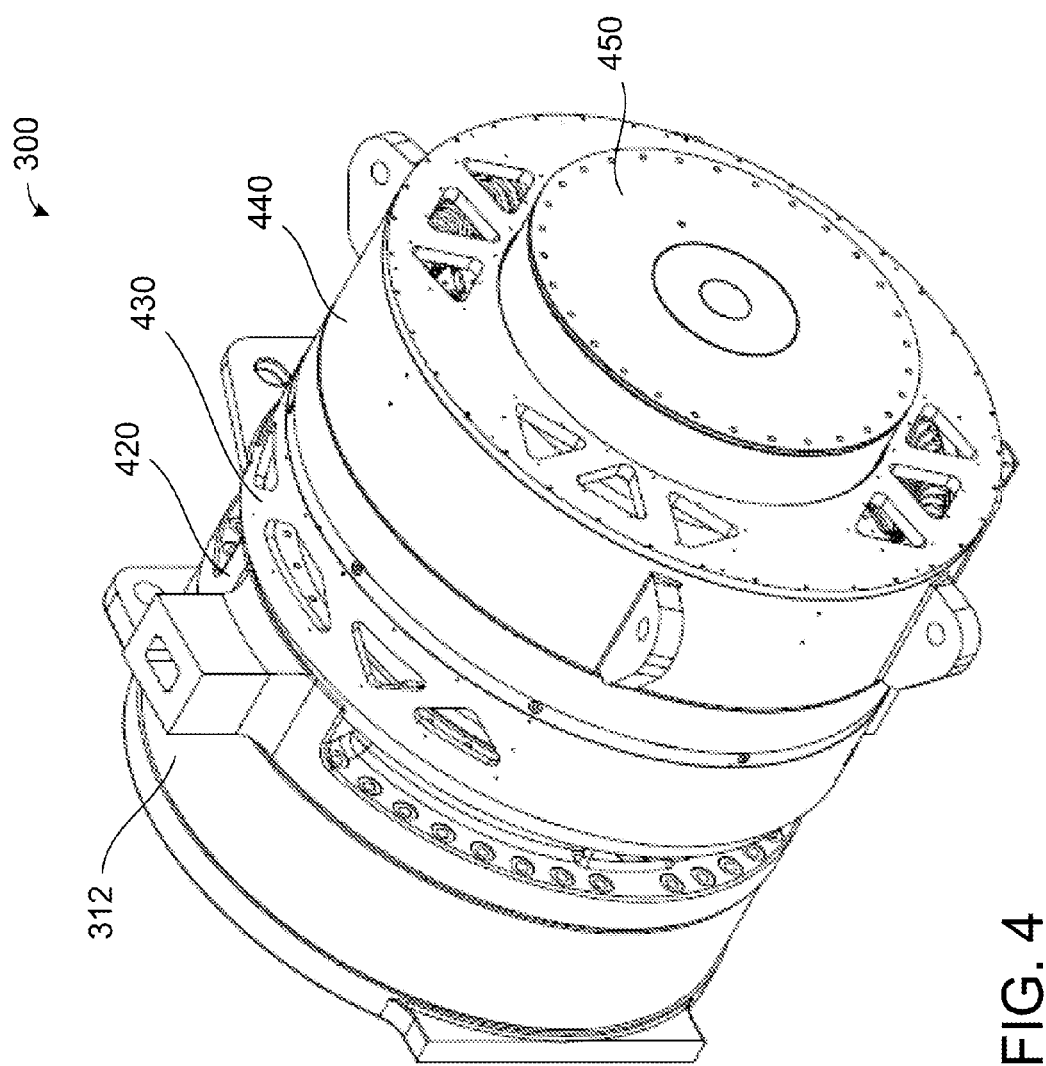
FIG. 4 is a perspective illustration of a drive train that could be used in the wind turbine of FIG. 1, according to an aspect of the present invention.

FIG. 4 illustrates a perspective view of the housing elements for the compact geared drive train 300. The first stage ring gear 312 forms its own outer housing and is connected to a first stage cover or housing 420. The first stage housing 420 is connected to a second stage housing 430 which in turn is connected to generator housing 440. The brake assembly housing 450 is connected to the generator housing 440.

One preferred generator 300 type is a PM synchronous generator, but induction generators, wound-field synchronous generators, or doubly-fed asynchronous generators could be used as well. A wind turbine employing a single generator has been described, but it is to be understood that multiple generators could also be used with modifications to the gearbox.

While various embodiments are described herein, it will be appreciated from the specification that various combinations of elements, variations or improvements therein may be made, and are within the scope of the invention.

What is claimed is:

1. A drive train for a wind turbine, the wind turbine comprising a rotor hub and one or more blades, the drive train comprising:
   a first stage carrier connected to the rotor hub, the first stage carrier including one or more first stage planet gears, the one or more first stage planet gears interacting with a fixed first stage ring gear and a rotating first stage sun gear;
   a second stage planet carrier including one or more second stage planet gears, the second stage planet carrier rigidly connected to the first stage sun gear, the one or more second stage planet gears interacting with a rotating second stage ring gear and a non-rotating second stage sun gear;
   a generator including a generator rotor and a generator stator, the generator rotor fixedly connected to the second stage ring gear so that both the generator rotor and the second stage ring gear rotate together.

2. The drive train of claim 1, further comprising one or more bearings interposed between the first stage carrier and the one or more first stage planet gears.

3. The drive train of claim 2, wherein the one or more bearings are roller bearings.

4. The drive train as defined in claim 1, further comprising a brake assembly configured to interact with the second stage planet carrier.

5. The drive train of claim 1, wherein the first stage ring gear forms a part of an outer housing for the drive train.

6. The drive train of claim 5, further comprising a first stage housing connected to the first stage ring gear.

7. The drive train of claim 6, further comprising a second stage housing connected to the first stage housing.

8. The drive train of claim 7, further comprising a generator housing connected to the second stage housing.

9. The drive train of claim 8, further comprising a brake assembly housing connected to the generator housing.

10. The drive train of claim 1, further comprising one or more roller bearings supporting the second stage ring gear.

11. The drive train of claim 10, wherein the one or more roller bearings are tapered roller bearings.

12. A wind turbine comprising:
   a tower;
   a nacelle supported by the tower;
   a rotor hub having one or more blades;
   a drive train comprising:
   a first stage carrier connected to the rotor hub, the first stage carrier including one or more first stage planet gears, the one or more first stage planet gears interacting with a fixed first stage ring gear and a rotating first stage sun gear;
   a second stage planet carrier including one or more second stage planet gears, the second stage planet carrier rigidly connected to the first stage sun gear, the one or more second stage planet gears interacting with a rotating second stage ring gear and a non-rotating second stage sun gear;
   a generator including a generator rotor and a generator stator, the generator rotor fixedly connected to the second stage ring gear so that both the generator rotor and the second stage ring gear rotate together.

13. The wind turbine of claim 12, further comprising one or more bearings interposed between the first stage carrier and the one or more first stage planet gears.

14. The wind turbine of claim 13, wherein the one or more bearings are roller bearings.

15. The wind turbine as defined in claim 12, further comprising a brake assembly configured to interact with the second stage planet carrier.

16. The wind turbine of claim 12, further comprising one or more roller bearings supporting the second stage ring gear.

17. The wind turbine of claim 16, wherein the one or more roller bearings are tapered roller bearings.

18. The wind turbine of claim 12, wherein the first stage ring gear forms a part of an outer housing for the drive train.

19. The wind turbine of claim 18, further comprising a first stage housing connected to the first stage ring gear.

20. The wind turbine of claim 19, further comprising:
a second stage housing connected to the first stage housing;
a generator housing connected to the second stage housing; and
a brake assembly housing connected to the generator housing.

\* \* \* \* \*